US011297607B2

United States Patent
Zhang et al.

(10) Patent No.: US 11,297,607 B2
(45) Date of Patent: *Apr. 5, 2022

(54) PERFORMANCE-BASED OPTIMIZATION OF QOS FACTORS

(71) Applicant: T-Mobile USA, Inc., Bellevue, WA (US)

(72) Inventors: Ting Zhang, Kirkland, WA (US); Sudhanshu Pandey, Bellevue, WA (US); Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/700,807

(22) Filed: Dec. 2, 2019

(65) Prior Publication Data

US 2020/0107313 A1 Apr. 2, 2020

Related U.S. Application Data

(63) Continuation of application No. 14/612,962, filed on Feb. 3, 2015, now Pat. No. 10,506,558, which is a
(Continued)

(51) Int. Cl.
*H04W 72/04* (2009.01)
*H04W 72/08* (2009.01)
(Continued)

(52) U.S. Cl.
CPC ....... *H04W 72/0406* (2013.01); *H04L 41/082* (2013.01); *H04L 41/0886* (2013.01);
(Continued)

(58) Field of Classification Search
CPC ........... H04W 72/0406; H04W 72/087; H04W 84/18; H04L 41/5032; H04L 41/20;
(Continued)

(56) References Cited

U.S. PATENT DOCUMENTS

2002/0158897 A1 10/2002 Besaw et al.
2005/0007993 A1 1/2005 Chambers et al.
(Continued)

FOREIGN PATENT DOCUMENTS

CN 1856959 A 11/2006
CN 101171853 A 4/2008
(Continued)

OTHER PUBLICATIONS

Translated Chinese Office Action dated Apr. 3, 2020 for Chinese Patent Application No. 201680007242.0, a counterpart foreign application of the U.S. Appl. No. 14/612,962, 8 pages.
(Continued)

*Primary Examiner* — Nicholas R Taylor
*Assistant Examiner* — Michael Li
(74) *Attorney, Agent, or Firm* — Lee & Hayes, P.C.

(57) ABSTRACT

Described herein are one or more self-organizing network (SON) components configured to determine QoS factors associated with QoS classes for a node of a telecommunication network based at least in part on performance metrics, network configuration, or network fault information. The one or more SON components may receive the performance metrics, network configuration, or network fault information from the node, and the performance metrics, network configuration, or network fault information may be associated with communication of traffic of the QoS classes by the node. Upon determining the QoS factors, the one or more SON components may transmit indications of the QoS factors to the node.

20 Claims, 5 Drawing Sheets

Related U.S. Application Data continuation-in-part of application No. 13/831,082, filed on Mar. 14, 2013, now Pat. No. 10,243,794.

(60) Provisional application No. 61/695,212, filed on Aug. 30, 2012.

(51) Int. Cl.

| | | |
|---|---|---|
| *H04W 84/18* | (2009.01) | |
| *H04L 41/08* | (2022.01) | |
| *H04L 41/00* | (2022.01) | |
| *H04L 41/082* | (2022.01) | |
| *H04L 41/5009* | (2022.01) | |
| *H04L 41/50* | (2022.01) | |
| *H04L 41/0816* | (2022.01) | |
| *H04L 43/0829* | (2022.01) | |
| *H04L 41/16* | (2022.01) | |
| *H04L 43/0852* | (2022.01) | |
| *H04L 43/087* | (2022.01) | |
| *H04L 41/22* | (2022.01) | |
| *H04L 43/0888* | (2022.01) | |

(52) U.S. Cl.
CPC .......... *H04L 41/20* (2013.01); *H04L 41/5009* (2013.01); *H04L 41/5032* (2013.01); *H04W 72/087* (2013.01); *H04W 84/18* (2013.01); *H04L 41/0816* (2013.01); *H04L 41/16* (2013.01); *H04L 41/22* (2013.01); *H04L 43/087* (2013.01); *H04L 43/0829* (2013.01); *H04L 43/0858* (2013.01); *H04L 43/0888* (2013.01)

(58) Field of Classification Search
CPC ............... H04L 41/5009; H04L 41/082; H04L 41/0886; H04L 43/0829; H04L 43/087; H04L 41/16; H04L 41/0816; H04L 43/0858; H04L 41/22; H04L 43/0888
See application file for complete search history.

(56) References Cited

U.S. PATENT DOCUMENTS

| | | | |
|---|---|---|---|
| 2005/0165906 A1 | 7/2005 | Deo et al. | |
| 2008/0139197 A1 | 6/2008 | Misra et al. | |
| 2008/0155087 A1* | 6/2008 | Blouin ................ | H04L 41/5006 709/223 |
| 2009/0006010 A1 | 1/2009 | Van Sloun et al. | |
| 2009/0216881 A1 | 8/2009 | Lovy et al. | |
| 2009/0257353 A1 | 10/2009 | Song et al. | |
| 2010/0009694 A1 | 1/2010 | Fischer | |
| 2010/0016034 A1 | 1/2010 | Lindqvist et al. | |
| 2010/0020699 A1 | 1/2010 | On | |
| 2010/0100758 A1 | 4/2010 | Houmaidi | |
| 2010/0150150 A1 | 6/2010 | Paz et al. | |
| 2010/0299419 A1 | 11/2010 | Ramankutty et al. | |
| 2010/0325267 A1 | 12/2010 | Mishra et al. | |
| 2011/0009105 A1 | 1/2011 | Lee et al. | |
| 2011/0010751 A1 | 1/2011 | Soulhi | |
| 2011/0053587 A1 | 3/2011 | Turk et al. | |
| 2011/0083138 A1 | 4/2011 | Sivasubramanian et al. | |
| 2011/0171952 A1 | 7/2011 | Niu | |
| 2011/0261721 A1 | 10/2011 | Zhou et al. | |
| 2011/0265011 A1 | 10/2011 | Taylor et al. | |
| 2011/0286337 A1 | 11/2011 | Olsson | |
| 2011/0289142 A1 | 11/2011 | Whalin et al. | |
| 2011/0300871 A1 | 12/2011 | Dottling et al. | |
| 2012/0039175 A1* | 2/2012 | Sridhar ................ | H04W 24/02 370/236 |
| 2012/0059923 A1 | 3/2012 | Cleary et al. | |
| 2012/0079066 A1 | 3/2012 | Li et al. | |
| 2012/0101952 A1 | 4/2012 | Raleigh et al. | |
| 2012/0108232 A1 | 5/2012 | Viering et al. | |
| 2012/0144038 A1 | 6/2012 | Hildebrand | |
| 2012/0146799 A1 | 6/2012 | Bell et al. | |
| 2012/0166008 A1 | 6/2012 | Jeong | |
| 2012/0170478 A1 | 7/2012 | Doettling et al. | |
| 2012/0179822 A1 | 7/2012 | Grigsby et al. | |
| 2012/0213057 A1 | 8/2012 | Zhang et al. | |
| 2012/0307697 A1 | 12/2012 | Mukhopadhyay | |
| 2012/0320766 A1 | 12/2012 | Sridhar | |
| 2013/0104173 A1 | 4/2013 | Tjio et al. | |
| 2013/0189941 A1 | 7/2013 | Abbott et al. | |
| 2013/0242720 A1 | 9/2013 | Chou | |
| 2013/0257623 A1 | 10/2013 | Bagasra | |
| 2013/0288681 A1 | 10/2013 | Hamalainen et al. | |
| 2013/0294286 A1 | 11/2013 | Schmelz et al. | |
| 2013/0305322 A1 | 11/2013 | Raleigh et al. | |
| 2014/0031006 A1 | 1/2014 | Moore et al. | |
| 2014/0040450 A1 | 2/2014 | Sanneck et al. | |
| 2014/0068034 A1 | 3/2014 | Tapia | |
| 2014/0086073 A1 | 3/2014 | Baykal et al. | |
| 2014/0229210 A1 | 8/2014 | Sharifian et al. | |
| 2014/0250201 A1 | 9/2014 | Tapia | |
| 2014/0331277 A1 | 11/2014 | Frascadore et al. | |
| 2014/0355439 A1 | 12/2014 | Kakadia | |
| 2014/0355484 A1* | 12/2014 | Foster .................. | H04W 16/18 370/255 |
| 2015/0023209 A1 | 1/2015 | Gunnarsson et al. | |
| 2015/0026327 A1 | 1/2015 | Tang et al. | |
| 2015/0043386 A1 | 2/2015 | Racz et al. | |
| 2015/0050925 A1 | 2/2015 | Tapia | |
| 2015/0146675 A1 | 5/2015 | Zhang et al. | |

FOREIGN PATENT DOCUMENTS

| | | |
|---|---|---|
| CN | 101478803 A | 7/2009 |
| CN | 103227995 | 7/2013 |
| EP | 2403290 A1 | 1/2012 |
| KR | 1020100047170 | 11/2011 |
| WO | WO2010132884 A1 | 1/2010 |
| WO | WO2013072271 A1 | 5/2013 |
| WO | WO2013124435 | 8/2013 |
| WO | WO2013136813 | 9/2013 |
| WO | WO2014003770 | 1/2014 |
| WO | WO2014023347 | 2/2014 |
| WO | WO2014036195 A1 | 3/2014 |

OTHER PUBLICATIONS

Tirado, et al., "Affinity P2P: A self-organizing content-based locality-aware collaborative peer-to-peer network", Computer Networks 54, Jun. 1, 2010, pp. 2056-2070.

Yilmaz et al., "Analysis of Antenna Parameter Optimization Space for 3GPP LTE", Vehicular Technology Conference (VTC 2009-Fall), Sep. 2009, 6 pages.

Ilyoung Chong HUFS Korea (Republic of), "The output draft Supplement document of Y.son-ngn;TD891 (NGN-GSI)", ITU-T draft; study period 2009-2012, International Telecommunication Union, Geneva, CH, Vo. 24/13, Feb. 16, 2012, pp. 1-32.

Translated Chinese Office Action dated Sep. 5, 2019, for Chinese Patent Application No. 201580051438.5, a counterpart of U.S. Appl. No. 14/496,185, 10 pages.

Chinese Office Action dated Sep. 5, 2019 for Chinese Patent Application No. 201580051438.5, a counterpart of U.S. Appl. No. 14/496,185, 8 pages.

Chinese Office Action dated Dec. 7, 2017 for Chinese patent application No. 201380043793.9, a counterpart foreign application of U.S. Appl. No. 13/831,082.

Chinese Office Action dated May 12, 2017 for Chinese patent application No. 201380043793.9, a counterpart foreign application of U.S. Appl. No. 13/831,082, 31 pages.

Chinese Office Action dated Sep. 5, 2016 for Chinese Patent Application No. 201380043793.9, a counterpart foreign application of U.S. Appl. No. 13/831,082, 34 pgs.

European Office Action dated Apr. 10, 2019 for European Patent Application No. 15844457.0, a counterpart of U.S. Appl. No. 14/496,185, 5 pages.

(56) References Cited

OTHER PUBLICATIONS

European Office Action dated May 24, 2018 for European Patent Application No. 13833979.1, a counterpart foreign application of U.S. Appl. No. 13/831,082, 9 pages.
European Office Action dated Aug. 6, 2018 for European Patent Application No. 15844457.0, a counterpart foreign application of U.S. Appl. No. 14/496,185, 4 pages.
Extended European Search Report dated Jan. 18, 2018 for European patent application No. 15844457.0, 12 pages.
Extended European Search Report dated Apr. 6, 2016 for European patent application No. 13833979.1, 9 pages.
Extended European Search Report dated Jun. 15, 2018 for European patent application No. 16747001.2, 9 pages.
Movehedi, et al., "A Survey of Autonomic Network Architentures and Evaluation Criteria", IEEE Communications Surveys & Tutorials, vol. 14, No. 2, May 2012, pp. 464-490.
Nascimento, et al., "Virtual routers as a service: the RouteFlow approach leveraging software-defined networks", Proceedings of the 6th International Conference on Future Internet Technologies, Jun. 2011, pp. 34-37.
Office Action for U.S. Appl. No. 13/831,082, dated Jan. 13, 2017, Tapia et al., "Open Architecture for Self-Organizing Networks", 22 pages.
Office Action for U.S. Appl. No. 14/612,962, dated Sep. 1, 2017, Zhang et al., "Performance-Based Optimization of QoS Factors", 19 pages.
Office Action for U.S. Appl. No. 14/277,389, dated Jan. 26, 2017, Tapia et al., "Network Support Node Traffic Reduction for Self-Organizing Networks", 17 pages.
Office Action for U.S. Appl. No. 14/278,271, dated Oct. 27, 2017, Tapia et al., "Special Events Module For Self-Organizing Networks", 19 pages.
Office Action for U.S. Appl. No. 14/278,271, dated Oct. 4, 2016, Tapia et al., "Special Events Module For Self-Organizing Networks", 12 pages.
Office Action for U.S. Appl. No. 14/612,962, dated Oct. 5, 2018, Zhang et al, "Performance-Based Optimization of QoS Factors", 18 pages.
Office Action for U.S. Appl. No. 13/831,082, dated Oct. 8, 2015, Tapia et al, "Open Architecture for Self-Organizing Networks", 17 pages.
Office Action for U.S. Appl. No. 14/496,185, dated Oct. 8, 2015, Tapia et al., "Self-Organizing Network Mechanism for Energy Saving During an Outage", 14 pages.
Office Action for U.S. Appl. No. 14/278,271 dated Nov. 19, 2018, Tapia et al., "Special Events Module For Self-Organizing Networks", 22 pages.
Office Action for U.S. Appl. No. 14/496,185, dated Nov. 4, 2016, Tapia et al., "Self-Organizing Network Mechanism for Energy Saving During an Outage", 23 pages.
Office Action for U.S. Appl. No. 14/278,271, dated Dec. 10, 2015, Tapia et al., "Special Events Module For Self-Organizing Networks", 10 pages.
Office Action for U.S. Appl. No. 14/277,389, dated Dec. 11, 2015, Tapia et al., "Network Support Node Traffic Reduction for Self-Organizing Networks", 16 pages.
Office Action for U.S. Appl. No. 14/496,185, dated Dec. 21, 2017, Tapia et al., "Self-Organizing Network Mechanism for Energy Saving During an Outage", 19 pages.
Office Action for U.S. Appl. No. 14/277,389, dated Dec. 28, 2017, Tapia et al., "Network Support Node Traffic Reduction for Self-Organizing Networks", 23 pages.
Office Action for U.S. Appl. No. 14/496,185, dated Feb. 7, 2019, Tapia et al., "Self-Organizing Network Mechanism for Energy Saving During an Outage", 19 pages.
Office Action for U.S. Appl. No. 14/612,962, dated Mar. 20, 2018, Zhang et al., "Performance-Based Optimization of QoS Factors", 25 pages.
Office Action for U.S. Appl. No. 14/496,185, dated Apr. 19, 2019, Tapia et al., "Self-Organizing Network Mechanism for Energy Saving During an Outage", 23 pages.
Office Action for U.S. Appl. No. 14/496,185, dated Apr. 20, 2016, Tapia et al., "Self-Organizing Network Mechanism for Energy Saving During an Outage", 17 pages.
Office Action for U.S. Appl. No. 14/278,271, dated Apr. 20, 2017, Tapia et al., "Special Events Module For Self-Organizing Networks", 13 pages.
Office Action for U.S. Appl. No. 14/612,962, dated Apr. 20, 2017, Zhang et al., "Performance-Based Optimization of QoS Factors", 16 pages.
Office Action for U.S. Appl. No. 13/831,082, dated Apr. 6, 2015, Tapia et al., "Open Architecture for Self-Organizing Networks", 16 pages.
Office Action for U.S. Appl. No. 14/278,271, dated May 18, 2018, Tapia et al., "Special Events Module For Self-Organizing Networks", 15 pages.
Office Action for U.S. Appl. No. 14/612,962, dated May 3, 2019, Zhang et al., "Performance-Based Optimization of QoS Factors", 18 pages.
Office Action for U.S. Appl. No. 14/496,185, dated Jun. 1, 2017, Tapia et al., "Self-Organizing Network Mechanism for Energy Saving During an Outage", 26 pages.
Office Action for U.S. Appl. No. 14/496,185, dated Jun. 25, 2018, Tapia et al., "Self-Organizing Network Mechanism for Energy Saving During an Outage", 22 pages.
Office Action for U.S. Appl. No. 14/278,271, dated Jun. 3, 2019, Tapia et al., "Special Events Module For Self-Organizing Networks", 21 pages.
Office Action for U.S. Appl. No. 13/831,082, dated Jul. 27, 2016, Tapia et al., "Open Architecture for Self-Organizing Networks", 24 pages.
Office Action for U.S. Appl. No. 14/277,389, dated Jul. 28, 2016, Tapia et al., "Network Support Node Traffic Reduction for Self-Organizing Networks", 17 pages.
Office Action for U.S. Appl. No. 14/278,271, dated Aug. 26, 2015, Tapia et al., "Special Events Module For Self-Organizing Networks", 10 pages.
Office Action for U.S. Appl. No. 14/277,389, dated Aug. 7, 2015, Tapia et al., "Network Support Node Traffic Reduction for Self-Organizing Networks", 15 pages.
Office Action for U.S. Appl. No. 14/612,962, dated Sep. 16, 2016, Zhang et al., "Performance-Based Optimization of QoS Factors", 17 pages.
Panisson, et al., "Designing the Architecture of P2P-Based Network Management Systems", Proceedings of the 11th IEEE Symposium on Computers and Communications, Jun. 2006, 7 pgs.
PCT Search Report and Written Opinion dated Dec. 2, 2013 for PCT application No. PCT/US13/57170, 10 pages.
PCT Search Report and Written Opinion dated Mar. 18, 2016 for PCT Application No. PCT/US2015/050740, 12 pages.
PCT Search Report and Written Opinion dated Jun. 29, 2016 for PCT application No. PCT/US2016/015184, 12 pages.
PCT Search Report and Written Opinion dated Aug. 10, 2015 for PCT application No. PCT/US2015/029518, 11 pages.
Scully, et al., "Measurements, Architecture and Interfaces for Self-Organizing Networks", Internet Citation, Oct. 31, 2010, pp. 1-47, retrieved from the internet at URL:http://www.fp7-socrates.eu/files/Deliverables/SOCRATES_D5.10%20Measurements,%20architecture%20and%20interfaces%20for%20self-organising%20networks.pdf, retrieved on Mar. 1, 2011.
Chinese Office Action dated Apr. 3, 2020 for Chinese Patent Application No. 201680007242.0, a counterpart foreign application of the U.S. Appl. No. 14/612,962, 9 pages.
European Office Action dated Nov. 19, 2020 for European Patent Application No. 15844457.0, a counterpart foreign application of U.S. Pat. No. 10,506,460, 5 pages.

\* cited by examiner

PERFORMANCE-BASED OPTIMIZATION OF QOS FACTORS

RELATED APPLICATIONS

This patent application is a continuation of, and claims priority to, U.S. patent application Ser. No. 14/612,962, filed on Feb. 3, 2015, which is a continuation-in-part of U.S. Non-provisional patent application Ser. No. 13/831,082, filed on Mar. 14, 2013, which claims priority filing benefit from U.S. Provisional Patent Application No. 61/695,212, filed Aug. 30, 2012. Application Ser. Nos. 14/612,962, 13/831,082 and 61/695,212 are hereby incorporated by reference, in their entirety.

BACKGROUND

The spectrum and backhaul resources of telecommunication networks are limited. As these networks communicate an increasing amount of data, congestion, delay, and failed connections become more common. Voice calls, video calls, and other real-time communications are often dropped, web pages load slowly, and movies must repeatedly pause in order for their buffers to refill. With such demands and limited resources, some priority must be given to certain types of network traffic. To provide such priority, telecommunication networks associate traffic with quality-of-service (QoS) classes. Such classes may refer to specific types of applications or service (e.g., voice calling, network browsing, etc.), different data types, different service categories, etc. Traffic of a higher priority QoS class may receive a better allocation of resources (e.g., frequency blocks, etc.) than traffic of a lower priority QoS class. Further, the QoS classes may be assigned different weights that affect the impact of the priorities. This weighting scheme, however, is static, with weights of QoS classes not changing with circumstances. For example, because of the static weighting scheme, traffic associated with a lower priority QoS class may receive a worse allocation of resources than necessary during a time when network services are not in demand.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, one or more SON components configured to determine QoS factors associated with QoS classes for a node of a telecommunication network based at least in part on performance metrics, network configuration, or network fault information. The one or more SON components may receive the performance metrics, network configuration, or network fault information from the node, and the performance metrics, network configuration, or network fault information may be associated with communication of traffic of the QoS classes by the node. Upon determining the QoS factors, the one or more SON components may transmit indications of the QoS factors to the node to enable the node to update its QoS class QoS factors. This reporting of performance metrics, network configuration, or network fault information and determining and updating of QoS factors may be performed repeatedly over time to optimize the QoS factors for the QoS classes at a node under different performance conditions. Such a dynamic scheme allows greater use of network resources during times with lower demand while carefully allocating such resources at times with higher demand.

Example Environment

Figure 1:
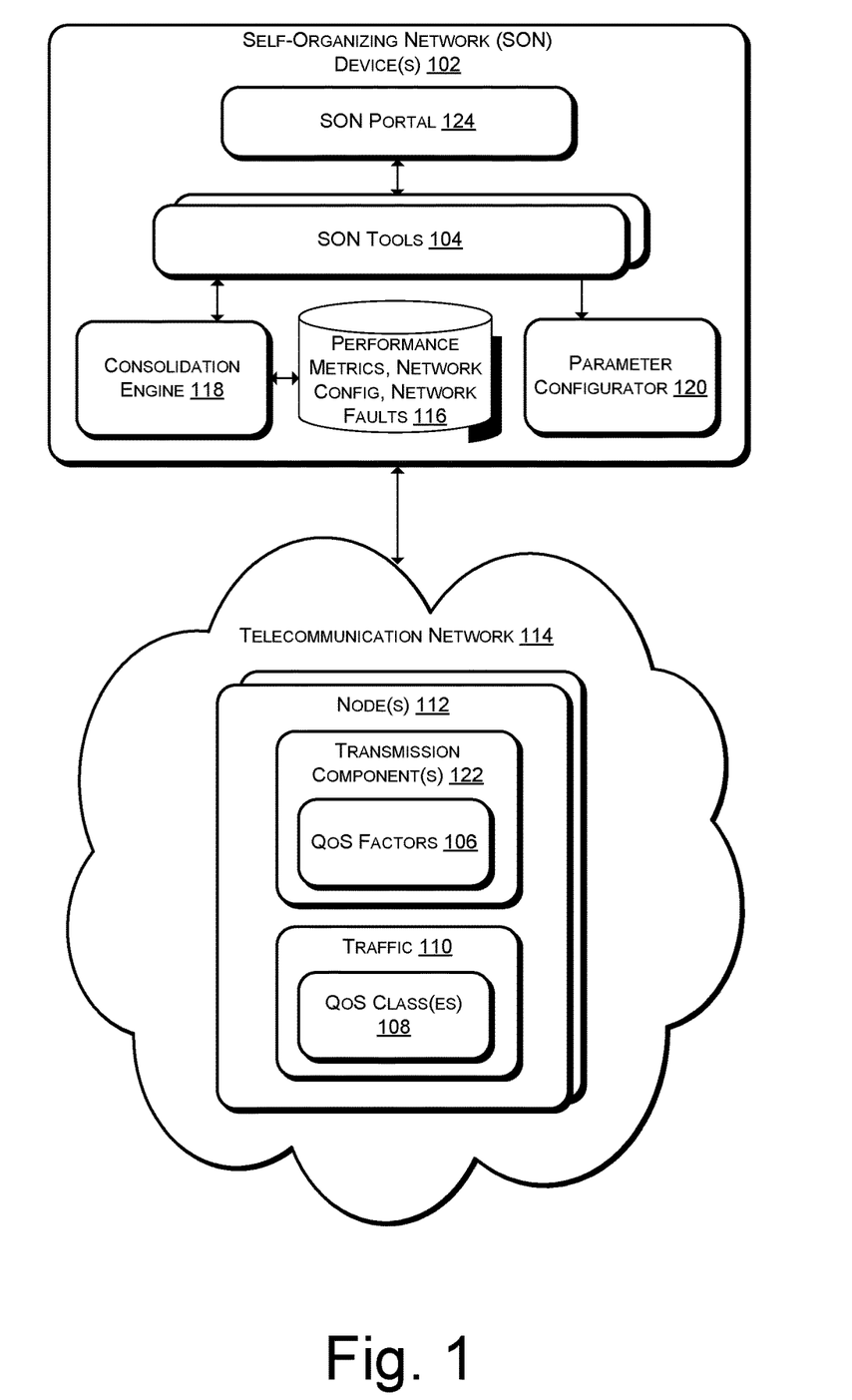
FIG. 1 illustrates an example environment including self-organizing network (SON) component(s) and node(s) of a telecommunication network, the SON component(s) receiving performance metrics, network configuration, or network fault information from the node(s), determining QoS factors for QoS classes for the node(s) based on the performance metrics, network configuration, or network fault information, and transmitting indications of the QoS factors to the node(s).

FIG. 1 illustrates an example environment including SON component(s) and node(s) of a telecommunication network, the SON component(s) receiving performance metrics, network configuration, or network fault information from the node(s), determining QoS factors for QoS classes for the node(s) based on the performance metrics, network configuration, or network fault information, and transmitting indications of the QoS factors to the node(s). As illustrated, one or more computing devices 102 configured with one or more SON components (referred to hereinafter as "SON device(s) 102") may include, among the SON component(s), one or more SON tools 104 configured to determine QoS factors 106 for QoS classes 108 associated with traffic 110 communicated by one or more nodes 112 of a telecommunication network 114. The SON component(s) of the SON device(s) 102 may also include a performance metrics, network configuration, or network fault information store 116 which receives and stores performance metrics, network configuration, or network fault information reported by the node(s) 112, a consolidation engine 118 to gather and utilize the performance metrics, network configuration, or network fault information, and a parameter configurator 120 to provide indications of the determined QoS factors to the node(s) 112. Transmission component(s) 122 of the node(s) 112 may update the QoS factors 106 based on the received indications and utilize the updated QoS factors 106 and QoS classes 108 in allocating network resources to different parts of traffic 110. Additionally, the SON component(s) of the SON device(s) 102 may include a SON portal 124 to enable configuration of the SON tools(s) 104.

Figure 2:
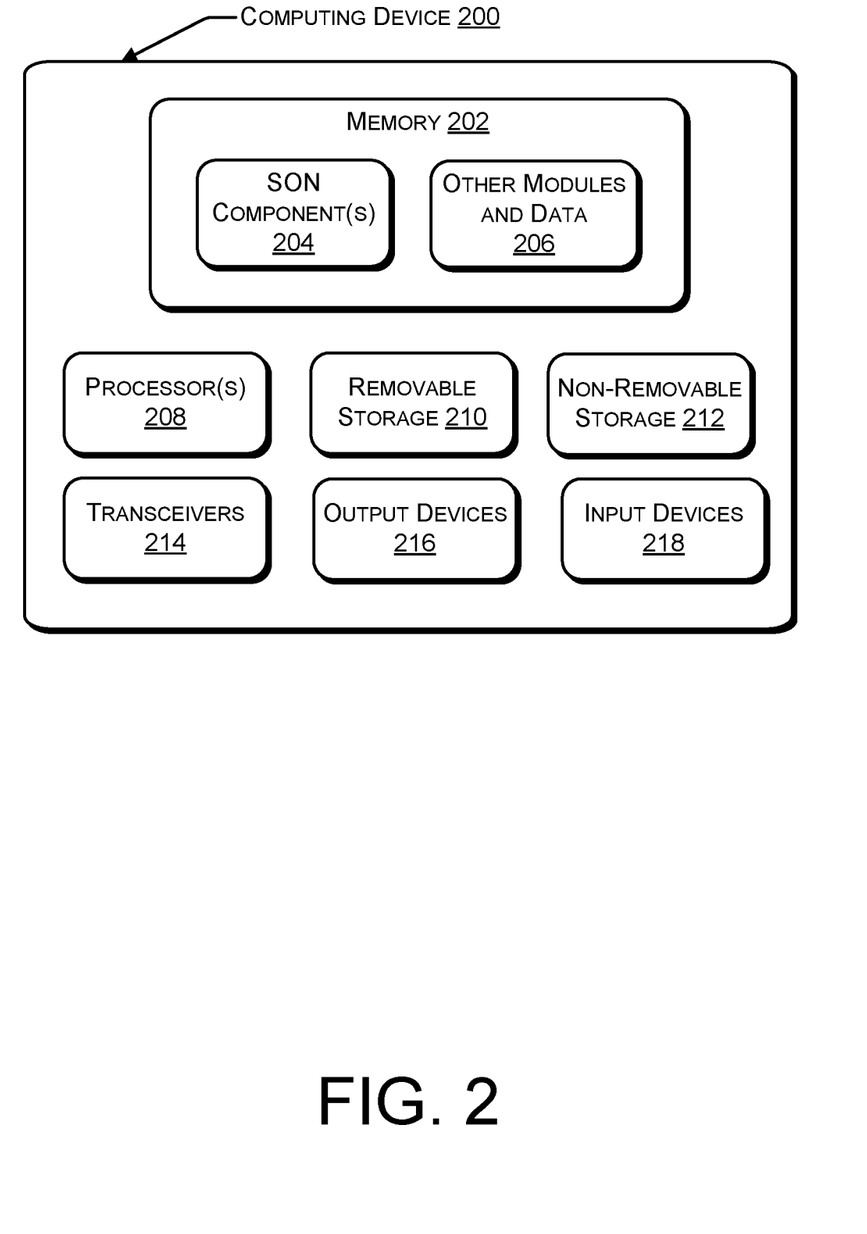
FIG. 2 illustrates a component level view of a computing device configured to implement one or more SON components.

In various implementations, the SON device(s) 102 may each be or include a server or server farm, multiple, distributed server farms, a mainframe, a work station, a personal computer (PC), a laptop computer, a tablet computer, an embedded system, or any other sort of device or devices. In one implementation, the SON device(s) 102 represent a plurality of computing devices working in communication, such as a cloud computing network of nodes. The SON device(s) 102 may belong to the telecommunication network 114 or may be external to but in communication with the telecommunication network 114. An example SON device 102 is illustrated in FIG. 2 and is described in detail below with reference to that figure.

The telecommunication network 114 may be any sort of telecommunication network of a telecommunication service provider and may include a core network and any one or more packet-switched access network(s), circuit-switched access network(s), or both. The access network(s) of the telecommunication network 114 may utilize 2G, 3G, 4G, 5G, Global System for Mobile Communications (GSM), Universal Mobile Telecommunication System (UMTS), High Speed Packet Access (HSPA), Evolved High Speed Packet Access (HSPA+), Long Term Evolution (LTE), WiFi, or WiMax technologies.

The telecommunication network 114 may be comprised of node(s) 112, including any or all of access network nodes 112, backhaul nodes 112, or core network nodes 112. The access network nodes 112 may include base stations, node Bs, eNode Bs, or radio network controllers (RNCs). The backhaul nodes 112 may be routers or gateways with Ethernet lines connected to other backhaul nodes 112, to access network nodes 112, to core network nodes 112, etc. Core network nodes 112 may be any nodes 112 of the telecommunication network 114 in a transmission path between two communicating end-points, one or both of which may be a mobile device receiving telecommunication services through an access network node 112.

Figure 3:
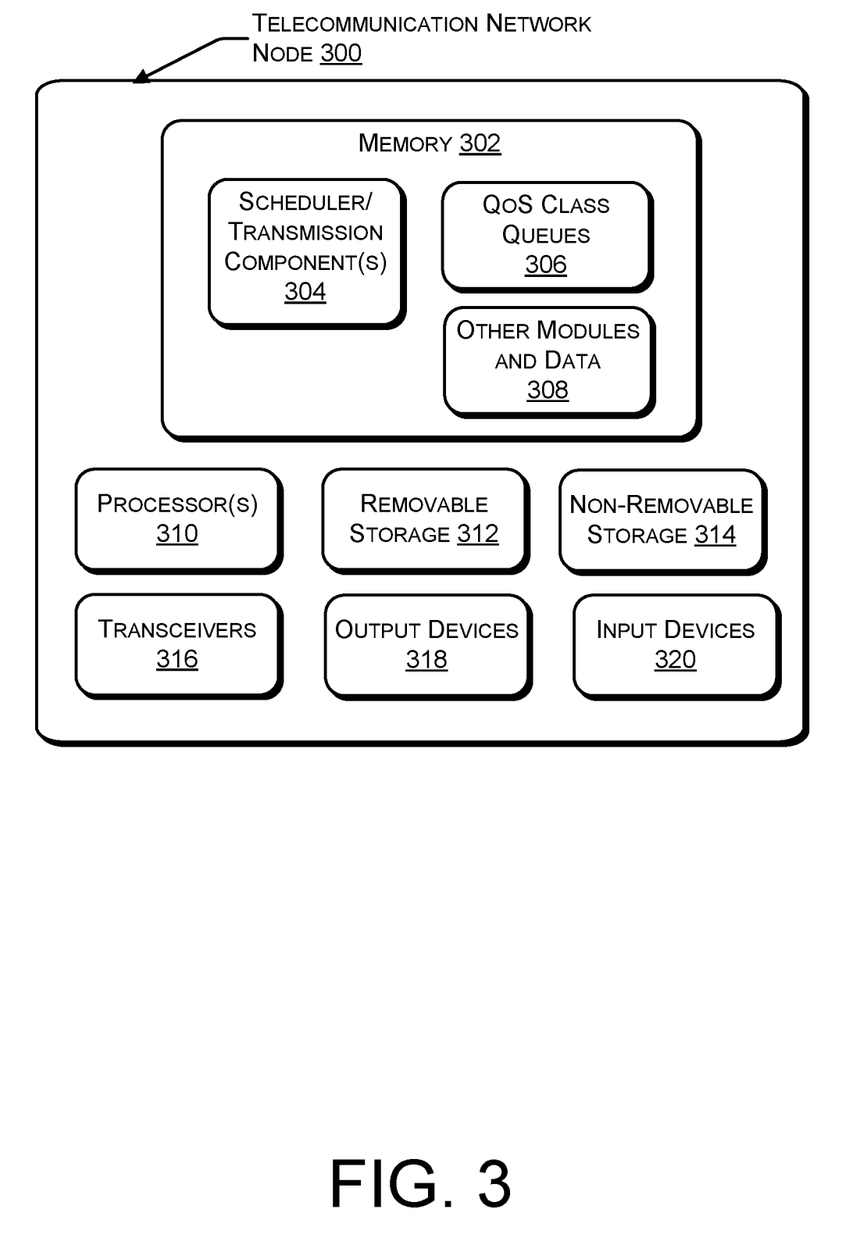
FIG. 3 illustrates a component level view of a node of the telecommunication network.

In various implementations, the node(s) 112 may each be or include a server or server farm, multiple, distributed server farms, a mainframe, a work station, a PC, a laptop computer, a tablet computer, an embedded system, or any other sort of device or devices. An example node 112 is illustrated in FIG. 3 and is described in detail below with reference to that figure.

As shown, the node(s) 112 may also include transmission component(s) 122. The transmission component(s) 122 may include any software components, hardware components, or both for monitoring and managing network resources of their respective node(s) 112 (e.g., cellular resources, backhaul resources, transport resources, core network resources, etc.). For example, an access network node 112 may be equipped with radios for sending and receiving traffic 110 over different bands of frequency spectrum, and the transmission component(s) 122 of such an access network node 112 may include a scheduler for allocating blocks of frequency bands to different mobile devices. The allocation by the scheduler may be based on the QoS class 108 associated with the traffic 110 with each mobile device. The QoS class 108 may be determined based on an application or service associated with the traffic 110 (e.g., voice calling, network browsing, etc.), based on different service categories (e.g., a brand associated with a service contract of a user of a mobile device), or based on a data type of the traffic 110. The scheduler may determine the application, data type, or service category associated with traffic 110 with each mobile device, associate QoS classes 108 with the traffic 110 based on those determinations, and utilize the QoS classes in determining which network resources to allocate to which mobile devices. The scheduler or other transmission component(s) 122 of the access network node 112 may also monitor performance metrics, network configuration, or network fault information and report those performance metrics, network configuration, or network fault information to the SON device(s) 102.

The transmission component(s) 122 of the backhaul nodes 112 and core network nodes 112 may determine the QoS class 108 to associate with traffic on a per-data-connection/service-flow basis rather than on a per-user basis. For a given data connection/service flow, such as a voice call connection, the transmission component(s) 122 of the backhaul node 112 or core network node 112 transmitting the traffic 110 associated with the voice call connection may determine the QoS class 108 for the traffic 110 (e.g., based on the application type—voice call—of the connection). The transmission component(s) 122 may then prioritize among the data packets constituting the traffic 110 based on the QoS class 108 associated with those data packets. In one example, data packets of a given QoS class 108 may be stored in a queue for that QoS class 108, and the transmission component(s) 122 may prioritize transmission over network resources based on queue. The transmission component(s) 122 may also monitor performance metrics, network configuration, or network fault information associated with communicating the traffic 110 and may report those performance metrics, network configuration, or network fault information to the SON device(s) 102.

In various implementations, the transmission component(s) 122 at a given node 112 may monitor and report on any sort of performance metrics, configuration, or fault information which may be indicative of the QoS being provided for traffic 110 associated with different QoS classes 108 at that given node 112. Example performance metrics may include at least one of throughput, delay, scheduling delay, queuing delay, jitter, packet loss, number of user, queue length, retransmission, utilization, usage, or latency. Example network configuration may include at least one of hardware configuration software configuration, parameter configuration, or capacity configuration. Example network fault information may include network alarms or warning. These performance metrics, network configuration, or network fault information, or any subset of them, may be gathered by the transmission component(s) 122 for traffic 110 on a per-QoS-class basis at the given node 112, so that there may be a set of performance metrics, network configuration, or network fault information for each QoS class 108 used by the given node 112, and reported to the SON device(s) 102. In some implementations, different performance metrics, network configuration, or network fault information may be gathered by the transmission component(s) 122 for different QoS classes 108, at different nodes 112, or both.

In addition to monitoring and reporting on performance metrics, network configuration, or network fault information, the transmission component(s) 122 of the nodes 112, may dynamically adjust QoS factors 106 associated with their QoS classes 108. These QoS factors 106 may be used along with the QoS classes 108 to adjust the priority given to traffic 110 of the different QoS classes 108. Examples of QoS factors 106 may include weights, delay budget, maximum bit rate, and minimum bit rate. For instance, traffic 110 associated with a QoS class 108 of '1' may be given a higher priority than traffic 110 with a QoS class 108 of '2', by the effect of that priority difference in allocating network resources may be affected by the QoS factors 106. The transmission component(s) 122 may receive indications of QoS factors 106 determined by the SON device(s) 102 from the SON device(s) 102 and may then update the QoS factors 106 based on the received indications. Those QoS factors 106 are then used by the transmission component(s) 122 in allocating network resources.

In some implementations, the transmission component(s) 122 may receive adjustments to the QoS class 108 associated with traffic 110 either in addition to or instead of the adjustments to the QoS factors 106. Responsive to receiving such adjustments to the QoS class 108 for a part of the traffic, the transmission component(s) 122 may reclassify that part of the traffic 110 with the adjusted QoS class 108.

In a first example, an access network node 112 may be experiencing heavy demand of its network resources. Many mobile devices may be connected to the access network node 112, and some of those mobile devices may be heavily utilizing cellular resource (e.g., by watching streaming video, etc.). The demand may exceed the available network resources of the access network node 112, causing delay or loss in the transmission of some packets. The transmission component(s) 122 of the access network node 112 may assign network resources based on QoS class 108, giving, for instance, higher priority to voice calls than to streaming movies. But even this may result in dropped calls if the QoS class 108 for voice calls is not given sufficient QoS factor. Thus, the transmission component(s) 122 report performance metrics, network configuration, or network fault information for the traffic 110 of the QoS classes 108 of the access network node 112 and receive indications of QoS factors 106 to use in return. The transmission component(s) 122 may then update the QoS factors 106 based on the indications, and the resulting QoS factors 106 may result in the QoS class 108 for the voice calls being given sufficient priority such that the voice calls are not dropped.

In a second example, an access network node 112 may be experiencing low demand of its network resources. It may, for instance, be late at night, with few real-time communications and streaming media sessions. There may be more than enough network resources for the demand. In allocating network resources, however, the transmission component(s) 122 may deprioritize traffic 110 of a lower priority QoS class 108, resulting in a poorer QoS being provided to that traffic 110 than need be under the conditions. To avoid this result, the transmission component(s) 122 report performance metrics, network configuration, or network fault information for the traffic 110 of the QoS classes 108 of the access network node 112 and receive indications of QoS factors 106 to use in return. The transmission component(s) 122 may then update the QoS factors 106 based on the indications, and the resulting QoS factors 106 may result in more equal treatment and better QoS across the board, for all traffic 110 of the access network node 112.

In various implements, the SON device(s) 102 may be associated with an operations support system (OSS) of the telecommunication network 114 or may be an application server or servers of the telecommunication network 114. The transmission component(s) 122 of the node(s) 112 may be configured to report performance metrics, network configuration, or network fault information to the SON device(s) 102 and to receive indications of QoS factors 106 from the SON device(s) 102. In some implementations, the consolidation engine 118 may be a SON component whose purpose to receive and store the performance metrics, network configuration, or network fault information in the performance metrics, network configuration, or network fault information store 116. The performance metrics, network configuration, or network fault information store 116 may be any sort of database, file, or data structure. Also, the performance metrics, network configuration, or network fault information store 116 may be associated with a schema, and the schema may be extended in response to the addition of new SON tools 104 or to the modification of a SON tool 104. In some implementations, the consolidation engine 118 may also filter out redundant or non-utilized performance metrics, network configuration, or network fault information.

The consolidation engine 118 may then automatically provide the performance metrics, network configuration, or network fault information from the performance metrics, network configuration, or network fault information store 116 to one or more of the SON tools 104 on, e.g., a periodic or event-driven basis. In some implementations, the consolidation engine 118 may pass performance metrics, network configuration, or network fault information to different ones of the SON tools 104 based on any or all of a type of node 112 associated with the performance metrics, network configuration, or network fault information, a QoS class associated with the performance metrics, network configuration, or network fault information, a time of day associated with the performance metrics, network configuration, or network fault information, various patterns or thresholds meeting the performance metrics, network configuration, or network fault information, etc. In other implementations, rather than automatically invoking SON tools 104, the consolidation engine 118 may be queried for performance metrics, network configuration, or network fault information by the SON tools 104.

In various implementations, the various SON components of the SON device(s) 102 may be connected by a SON API. The API may be an API for SONs that may be standardized and shared among multiple SONs. When standardized, the API may expose at least one of standardized methods/procedures or standardized parameters, such as the performance metrics, network configuration, or network fault information. In other implementations, the architecture utilizing the API may be standardized among multiple SONs, but the API may be specific to the SON device(s) 102. In addition, the API may include methods for providing data to or for receiving or retrieving data from any of the SON components 104, 116-120, and 124. In some implementations, the API may include methods for alerts or alarms that may be utilized by the SON tools 104 to receive notifications that, for example, a performance metric exceeds a threshold. Also, the API may be a separate SON component or may be methods/processes of other SON components, such as SON components 104, 116-120, and 124, and the API may simply be a logical representation. An example SON API is described in greater detail in application Ser. No. 13/831,082, which is incorporated by reference above.

Upon receiving or retrieving the performance metrics, network configuration, or network fault information through consolidation engine 118, the SON tool(s) 104 may determine QoS factors 106 for the QoS classes 108 of the nodes(s) 112 based on those performance metrics, network configuration, or network fault information. The SON tool(s) 104 may use or be configured in accordance with a policy of the telecommunication network operator providing different levels of QoS to different classes of traffic 110 in different circumstances. Each policy may comprise or be resolved to a model or rule set associated different QoS factors 106 or weigh-adjustments with different combinations of performance metrics, network configuration, or network fault information, node types, QoS class types, times of day, network conditions, or other sorts of parameters. Upon determining the QoS factors 106 or QoS factor adjustments, the SON tool(s) 104 may provide the QoS factors 106 or QoS factor adjustments to the parameter configurator 120, through, e.g., the SON API.

The SON tool(s) 104 may also each invoke a SON component to perform an action based on the performance metrics, network configuration, or network fault information, invoke an engineering tool based on the performance metrics, network configuration, or network fault information, pass information associated with the performance metrics, network configuration, or network fault information to a SON component, send a notification associated with the performance metrics, network configuration, or network fault information, or generate of a report based on the performance metrics, network configuration, or network fault information. A SON tool 104 may also be invoked by another SON tool 104, and those SON tools 104 may collaborate to determine the QoS factors 106.

In some implementations, the SON tool(s) 104 may comprise different tools 104 for different types of nodes 112, different tools 104 for different times of day, different tools 104 for different network conditions, etc. Alternatively, a single SON tool 104 or set of SON tools 104 may be used for multiple types of nodes 112, times of day, network conditions, etc. with policy and configuration specifying a same or different treatment in view of those differences. For example, the SON tool(s) 104 may determine different QoS factors 106 for different types of node(s) 112 even if performance metrics, network configuration, or network fault information are the same or similar. The SON tool(s) 104 may also determine different QoS factors 106 for different times of day or network conditions when performance metrics, network configuration, or network fault information are the same or similar. Alternatively, similar or same QoS factors 106 may be determined despite differences in type of node 112, time of day, network conditions, etc.

Further, the SON tool(s) 104 may be configured to monitor results of adjustments of QoS factors 106 and to modify its model or rule set based on the monitoring. Such feedback and refinement may utilize machine learning techniques. Alternatively or additionally, the SON tool(s) 104 may make smaller adjustments to the QoS factors 106, gradually increasing or decreasing them over a number of iterations of updates and performance metric reports. Such a gradual approach may improve functioning without introducing other additional performance issues.

Also, in some implementations, the SON tool(s) 104 may adjust the QoS class 108 for the traffic 110 associated with the performance metrics, network configuration, or network fault information. The SON tool(s) 104 may do this instead of or in addition to determining QoS factors 106. Such a QoS class adjustment may also be provided to the node(s) 112 through the parameter configurator 120.

In various implementations, the SON tool(s) 104 may be created or modified by a SON portal 124. The SON portal 124 may be a user-facing component for displaying information and enabling specification of SON tool(s) 104 by users (e.g., personnel of the telecommunication network operator). The SON portal 124 may offer a user interface for textual or graphical specification of a new SON tool 104 or for configuring/updating of an existing SON tool 104. Such a user interface may simply accept textually-specified code for a SON tool 104, or may even allow a user to select graphical representations of SON components (e.g., a graphical representation of the consolidation engine 118) to cause automatic specification of code for accessing the SON component.

As mentioned, upon determining the QoS factors 106 or QoS factor adjustments, the SON tool(s) 104 may provide the QoS factors 106 or QoS factor adjustments to the parameter configurator 120. Upon retrieving or receiving the QoS factors 106 or QoS factor adjustments, the parameter configurator 114 transmits indications of the QoS factors 106 or QoS factor adjustments to the node(s) 112.

Example Devices

FIG. 2 illustrates a component level view of a computing device configured to implement one or more SON components. As illustrated, the computing device 200 comprises a system memory 202 storing one or more SON components 204 and other modules and data 206. Also, the computing device 200 includes processor(s) 208, a removable storage 210, a non-removable storage 212, transceivers 214, output device(s) 216, and input device(s) 218.

In various implementations, system memory 202 is volatile (such as RAM), non-volatile (such as ROM, flash memory, etc.) or some combination of the two. The SON component(s) 204 may be any one or more of the SON tools 104, the performance metrics, network configuration, or network fault information store 116, the consolidation engine 118, the parameter configurator 120, or the SON portal 124 described above in detail with regard to FIG. 1. The other modules or data 206 stored in the system memory 202 may comprise any sort of applications or platform components of the computing device 200, as well as data associated with such applications or platform components.

In some implementations, the processor(s) 208 is a central processing unit (CPU), a graphics processing unit (GPU), or both CPU and GPU, or any other sort of processing unit.

Non-transitory computer-readable media may include volatile and nonvolatile, removable and non-removable tangible, physical media implemented in technology for storage of information, such as computer readable instructions, data structures, program modules, or other data. System memory 202, removable storage 210 and non-removable storage 212 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the computing device 200. Any such non-transitory computer-readable media may be part of the computing device 200.

In some implementations, the transceivers 214 include any sort of transceivers known in the art. For example, transceivers 214 may include a radio transceiver that performs the function of transmitting and receiving radio frequency communications via an antenna. The transceivers 214 may facilitate wireless connectivity between the computing device 200 and various nodes of the telecommunication network 114. In addition, the transceivers 214 may also include a wireless communication transceiver and a near field antenna for communicating over unlicensed wireless IP networks, such as local wireless data networks and personal area networks (e.g., Bluetooth or near field communication (NFC) networks). Further, the transceivers 214 may include wired communication components, such as an Ethernet port, that connect the computing device 200 in a wired fashion to one or more nodes of the telecommunication network 114.

In some implementations, the output devices 216 include any sort of output devices known in the art, such as a display (e.g., a liquid crystal display), speakers, a vibrating mechanism, or a tactile feedback mechanism. Output devices 216 also include ports for one or more peripheral devices, such as headphones, peripheral speakers, or a peripheral display.

In various implementations, input devices 218 include any sort of input devices known in the art. For example, input devices 218 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

FIG. 3 illustrates a component level view of a node of the telecommunication network ("telecommunication network node"). The telecommunication network node may be any of an access network node, a backhaul node, or a core network node. As illustrated, the telecommunication network node 300 comprises a system memory 302 storing a scheduler/transmission component(s) 304, QoS class queues 306, and other modules and data 308. Also, the telecommunication network node 300 includes processor(s) 310, a removable storage 312, a non-removable storage 314, transceivers 316, output device(s) 318, and input device(s) 320.

In various implementations, system memory 302 is volatile (such as RAM), non-volatile (such as ROM, flash memory, etc.) or some combination of the two. The scheduler/transmission component(s) 304 may be any sort of scheduler/transmission components, such as the transmission component(s) 122 described above. The QoS class queues 306 may be queues for traffic 110, each QoS class queue 306 being associated with a QoS class 108. Such queues 306 may store traffic 110 while it awaits transmission. The other modules or data 308 stored in the system memory 302 may comprise any sort of applications or platform components of the telecommunication network node 300, as well as data associated with such applications or platform components.

In some implementations, the processor(s) 310 is a central processing unit (CPU), a graphics processing unit (GPU), or both CPU and GPU, or any other sort of processing unit.

Non-transitory computer-readable media may include volatile and nonvolatile, removable and non-removable tangible, physical media implemented in technology for storage of information, such as computer readable instructions, data structures, program modules, or other data. System memory 302, removable storage 312 and non-removable storage 314 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the telecommunication network node 300. Any such non-transitory computer-readable media may be part of the telecommunication network node 300.

In some implementations, the transceivers 316 include any sort of transceivers known in the art. For example, transceivers 316 may include a radio transceiver that performs the function of transmitting and receiving radio frequency communications via an antenna. The transceivers 316 may facilitate wireless connectivity between the telecommunication network node 300 and various nodes or devices of the telecommunication network (e.g., SON device(s) 102 or nodes(s) 112). In addition, the transceivers 316 may also include a wireless communication transceiver and a near field antenna for communicating over unlicensed wireless IP networks, such as local wireless data networks and personal area networks (e.g., Bluetooth or near field communication (NFC) networks). Further, the transceivers 316 may include wired communication components, such as an Ethernet port, that connect the telecommunication network node 300 in a wired fashion to one or more nodes or devices of the telecommunication network.

In some implementations, the output devices 318 include any sort of output devices known in the art, such as a display (e.g., a liquid crystal display), speakers, a vibrating mechanism, or a tactile feedback mechanism. Output devices 318 also include ports for one or more peripheral devices, such as headphones, peripheral speakers, or a peripheral display.

In various implementations, input devices 320 include any sort of input devices known in the art. For example, input devices 320 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Example Processes

Figure 4:
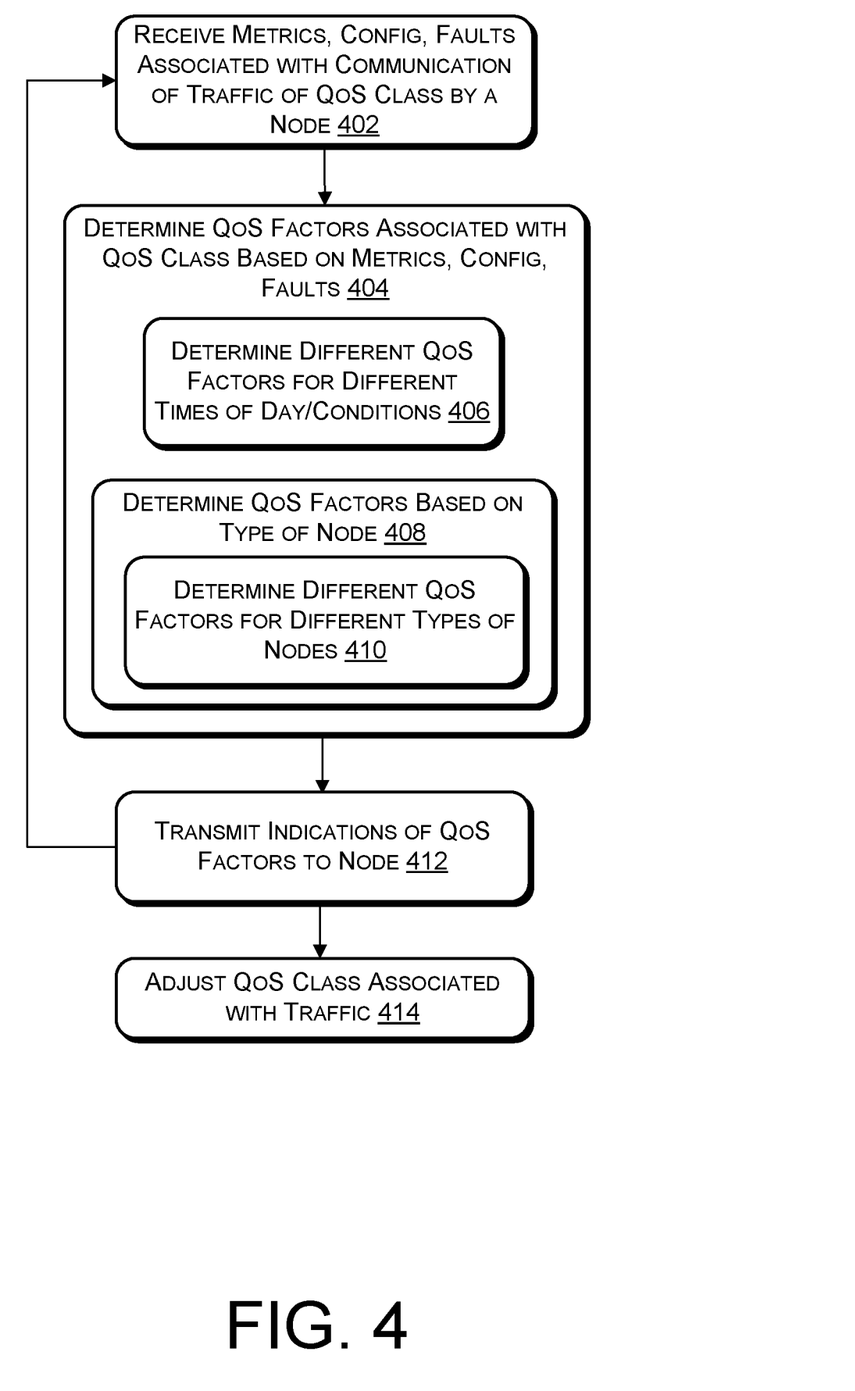
FIG. 4 illustrates an example process for determining, by SON component(s), QoS factors for QoS classes of a telecommunication network node based on performance metrics, network configuration, or network fault information associated with communication of traffic of the QoS classes.
Figure 5:
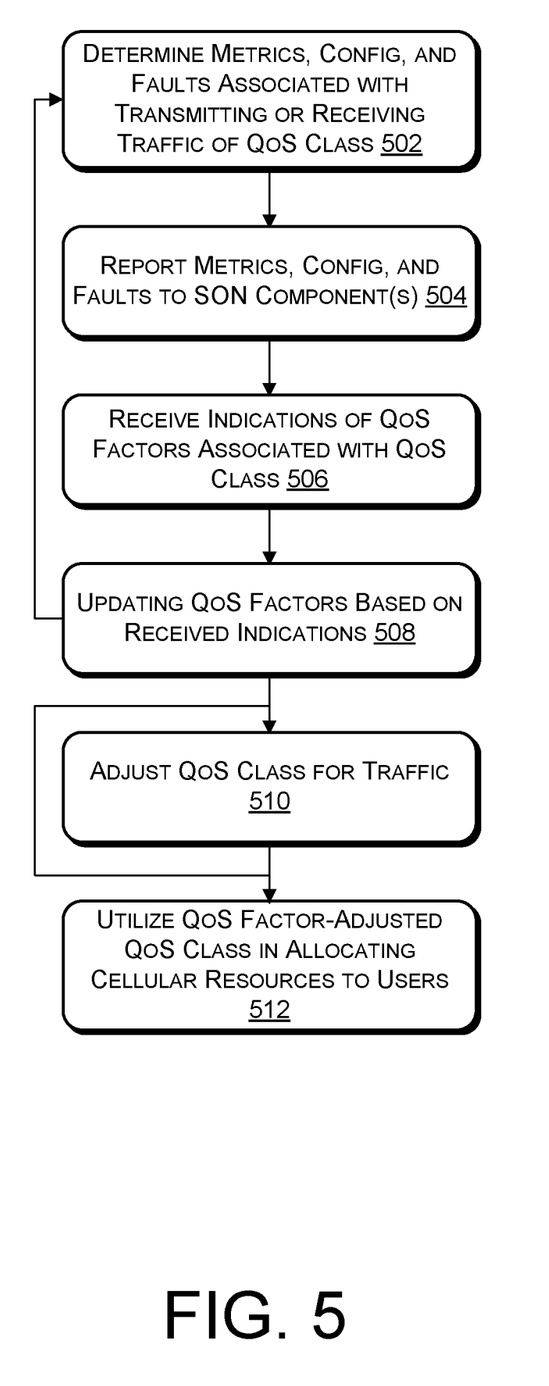
FIG. 5 illustrates an example process for reporting, by a telecommunication network node, performance metrics, network configuration, or network fault information associated with communication of traffic of the QoS classes, receiving indications of QoS factors for the QoS classes, and updating the QoS factors based on the received indications.

FIGS. 4 and 5 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 4 illustrates an example process for determining, by SON component(s), QoS factors for QoS classes of a telecommunication network node based on performance metrics, network configuration, or network fault information associated with communication of traffic of the QoS classes. The process includes, at 402, receiving, by one or more SON components, performance metrics, network configuration, or network fault information associated with communication of traffic of one or more QoS classes by a node of a telecommunication network. The QoS classes may be associated with different applications, different data types, or different service categories. Further, the node may be an access network node, a backhaul node, or a core network node. Also, the performance metrics, network configuration, or network fault information may include at least one of throughput, delay, scheduling delay, queuing delay, jitter, packet loss, number of user, or latency. In some examples, the performance metrics, network configuration, or network fault information are specific to traffic for a specific QoS class. In further examples, the performance metrics, network configuration, or network fault information include multiple sets of metrics correspondingly associated with traffic of multiple QoS classes.

At 404, the SON component(s) determine QoS factors associated with the one or more QoS classes based at least in part on the performance metrics, network configuration, or network fault information. At 406, the determining comprises determining different QoS factors for different times of day or different network conditions. At 408, the determining comprises determining the QoS factors based on a type of the node. At 410, determining the QoS factors based on a type of the node includes determining different QoS factors for different types of nodes.

At 412, the SON component(s) transmit indications of the QoS factors to the node of the telecommunication network.

In some implementations, the SON component(s) may repeatedly perform the receiving at 402, the determining at 404, and the transmitting at 412 to incrementally adjust the QoS factors (e.g., gradually increase weights).

At 414, the SON component(s) may adjust the QoS class associated with the traffic.

FIG. 5 illustrates an example process for reporting, by a telecommunication network node, performance metrics, network configuration, or network fault information associated with communication of traffic of the QoS classes, receiving indications of QoS factors for the QoS classes, and updating the QoS factors based on the received indications. The example process includes, at 502, determining, by a node of a telecommunication network, performance metrics, network configuration, or network fault information associated with transmitting or receiving traffic of one or more QoS classes. The performance metrics, network configuration, or network fault information may include at least one of throughput, delay, scheduling delay, queuing delay, jitter, packet loss, number of user, or latency. The QoS classes may be associated with different applications, different data types, or different service categories.

At 504, the node may report the performance metrics, network configuration, or network fault information to one or more SON components of the telecommunication network.

At 506, the node may receive indications of QoS factors associated with the one or more QoS classes.

At 508, the node may update the QoS factors associated with the one or more QoS classes based on the received indications.

In some implementations, the node may repeatedly perform the determining at 502, the reporting at 504, the receiving at 506, and the updating at 508 to incrementally adjust the QoS factors At 510, the node may also or instead the QoS class associated with the traffic (based, e.g., on instructions from SON component(s)).

At 512, the node may utilize QoS factored QoS classes in allocating network resources to users.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
receiving, from a node of a telecommunication network by one or more self-organizing network (SON) components of a SON device, performance metrics, network configuration, or network fault information for a plurality of quality-of-service (QoS) classes of traffic handled by the node, wherein the performance metrics, the network configuration, or the network fault information for a particular QoS class indicates a QoS that the node is providing for traffic of the particular QoS class;

determining, by the one or more SON components, updated QoS factors associated with the plurality of QoS classes for the node based at least in part on the performance metrics, the network configuration, or the network fault information, the updated QoS factors including at least maximum or minimum bit rates associated with specific ones of the plurality of QoS classes; and transmitting, by the one or more SON components to the node, indications of the updated QoS factors, wherein the indications of the updated QoS factors instruct the node to adjust, based on the updated QoS factors, prioritized allocation of network resources for traffic of different ones of the plurality of QoS classes.

2. The computer-implemented method of claim 1, wherein the determining comprises determining different updated QoS factors for different times of day or different network conditions.

3. The computer-implemented method of claim 1, wherein the plurality of QoS classes are associated with different applications, different data types, or different service categories.

4. The computer-implemented method of claim 1, wherein the node is an access network node, a backhaul node, or a core network node.

5. The computer-implemented method of claim 1, wherein the determining includes determining the updated QoS factors based on a type of the node.

6. The computer-implemented method of claim 5, wherein the determining the updated QoS factors based on the type of the node comprises determining different updated QoS factors for different types of nodes.

7. The computer-implemented method of claim 1, wherein the performance metrics, network configuration, or network fault information include at least one of throughput, delay, scheduling delay, queuing delay, jitter, packet loss, number of user, or latency.

8. The computer-implemented method of claim 1, further comprising adjusting at least one QoS class associated with the traffic.

9. The computer-implemented method of claim 1, further comprising repeatedly performing the receiving, the determining, and the transmitting to incrementally change how the node allocates network resources for traffic of different ones of the plurality of QoS classes based on incrementally different updated QoS factors.

10. A non-transitory computer-readable medium having a plurality of programming instructions stored thereon which, when executed by a node of a telecommunication network, cause the node to perform operations comprising:

prioritizing allocation of network resources for traffic of a plurality of quality-of-service (QoS) classes based on QoS factors associated with the plurality of QoS classes;

determining performance metrics, network configuration, or network fault information associated with transmitting or receiving traffic of the plurality of QoS classes, wherein the performance metrics, the network configuration, or the network fault information for a particular QoS class indicates a QoS that the node is providing for traffic of the particular QoS class;

reporting the performance metrics, network configuration, or network fault information to one or more self-organizing network (SON) components of the telecommunication network;

receiving, from the SON components, indications of updated QoS factors associated with the plurality of QoS classes, the updated QoS factors including at least maximum or minimum bit rates associated with specific ones of the plurality of QoS classes; and dynamically updating the QoS factors associated with the plurality of QoS classes to match the updated QoS factors based on the indications, wherein updating the QoS factors to match the updated QoS factors adjusts prioritized allocation of network resources for traffic of different ones of the plurality of QoS classes.

11. The non-transitory computer-readable medium of claim 10, wherein the operations further comprise repeatedly performing the prioritizing, the determining, the reporting, the receiving, and the dynamically updating to incrementally change how the node allocates the network resources for traffic of different ones of the plurality of QoS classes based on incrementally different updated QoS factors.

12. The non-transitory computer-readable medium of claim 10, wherein the plurality of QoS classes are associated with different applications, different data types, or different service categories.

13. The non-transitory computer-readable medium of claim 10, wherein the node is an access network node, a backhaul node, or a core network node.

14. The non-transitory computer-readable medium of claim 10, wherein the performance metrics, network configuration, or network fault information include at least one of throughput, delay, scheduling delay, queuing delay, jitter, packet loss, number of user, or latency.

15. The non-transitory computer-readable medium of claim 10, wherein the operations further comprise adjusting at least one QoS class associated with the traffic.

16. A system comprising:
one or more processors;
a consolidation engine configured to be operated by the one or more processors to receive performance metrics, network configuration, or network fault information associated with transmission of traffic of individual ones of a plurality of quality-of-service (QoS) classes by a node of a telecommunication network, wherein the performance metrics, the network configuration, or the network fault information for a particular QoS class indicates a QoS that the node is providing for traffic of the particular QoS class;
a self-organizing network (SON) tool configured to be operated by the one or more processors to determine updated QoS factors associated with the plurality of QoS classes based at least in part on the performance metrics, network configuration, or network fault information, the updated QoS factors including at least maximum or minimum bit rates associated with specific ones of the plurality of QoS classes; and
a parameter configurator configured to be operated by the one or more processors to transmit indications of the updated QoS factors to the nodes of the telecommunication network,
wherein the indications of the updated QoS factors instruct the node to adjust, based on the updated QoS factors, prioritized allocations of network resources for traffic of different ones of the plurality of QoS classes.

17. The system of claim 16, further comprising a SON portal to enable configuration of the SON tool.

18. The system of claim 16, wherein the SON tool is configured to determine different updated QoS factors for different times of day or different network conditions.

19. The system of claim 16, wherein the plurality of QoS classes are associated with different applications, different data types, or different service categories.

20. The system of claim 16, wherein the node of the telecommunication network is an access network node, a backhaul node, or a core network node.

* * * * *